April 10, 1973 B. FUTTERERER 3,726,770

ELECTRODEPOSITION PROCESS FOR PRODUCING PERFORATED FOILS WITH RAISED PORTIONS AT THE EDGES OF THE HOLES

Original Filed July 6, 1967

United States Patent Office 3,726,770

Patented Apr. 10, 1973

3,726,770

ELECTRODEPOSITION PROCESS FOR PRODUCING PERFORATED FOILS WITH RAISED PORTIONS AT THE EDGES OF THE HOLES

Bodo Futterer, Lucerne, Switzerland, assignor to The Gillette Company, Boston, Mass.

Continuation of application Ser. No. 52,810, July 7, 1970, which is a division of application Ser. No. 651,548, July 6, 1967, both now abandoned. This application Jan. 4, 1972, Ser. No. 215,377

Claims priority, application Switzerland, July 6, 1966, 9,843/66

Int. Cl. C23b *5/48;* B01k *1/00*

U.S. Cl. 204—16 2 Claims

ABSTRACT OF THE DISCLOSURE

A repairable master negative and a process for producing a master negative suitable for the production of a number of perforated foils and for regenerating such a master negative when it is worn, comprising applying insulating material to one surface of a metallic base plate that is stable in a bath of an alkali at selected areas thereof which conform with the perforations in the foils to be produced, applying a coating of a metal which is erodable in a bath of an alkali which is built up on the metallic base plate after the insulating areas have been applied to it, and passivating the metallic coating When the master negative is worn due to the production of a number of perforated foils, it is repaired by stripping off electrolytically in a bath of an alkali the metallic coating and a new metallic coating is electrodeposited on the metallic base plate without disturbing the insulated areas.

Figure 1:
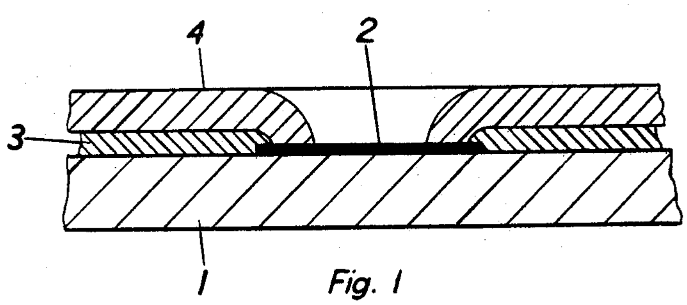

This is a continuation of application Ser No. 52,810 filed July 7, 1970 and now abandoned, which is a division of application Ser. No. 651,548, filed July 6, 1967, and now abandoned.

The invention relates to an electrodeposition process for producing perforated foils with raised portions at the edges of the holes, as used in particular for screens and shearing foils of electric shavers.

A process for making perforated foils by electrodeposition is already known according to which a metal plate serving as a master negative is covered with an electrically insulating material in the areas of the holes so as to prevent the electrodeposition of the metal thereat; while that part of the master negative which is left free from insulating material and on which the deposit is to be effected is provided by electroplating with a metal coating the thickness of which is such that the areas covered by insulating material are framed to a certain extent, after which the metal coating is passivated.

A process such as this gives a master negative with which a number of perforated foils can be produced. Thereafter, however, the master negative must be reprepared, namely by removing the entire surface of the master negative down to the metal base plate and then rebuilding it.

In the production of shearing foils for dry shavers, great demands are made as to the accuracy and the quality of the surface of shearing foils produced with a master negative. It has been found that when using a master negative made by said known process only few shearing foils made with it are of sufficiently good quality. Moreover, the repreparation of a master negative is a relatively costly procedure, since the surface of the metal base plate must be ground.

It is an object of the invention to provide a process for producing master negatives which may be used repeatedly in the production of perforated foils with raised edge portions.

A further object of the invention is to provide a process for the production of master negatives which is simple to carry out and which leads to master negatives of great accuracy.

Yet another object of the invention is the provision of a process for the production of master negatives which enables a simple repreparation of a worn master negative.

Still another object of the invention is to provide a process for economically producing perforated foils of outstanding quality, wherein a metal base plate stable in a bath of alkali, is covered with an electrically insulating material, also stable in a bath of alkali in the area of the holes in order to prevent electrodeposition of metal at that areas. Thereafter the metal base plate is plated with a coating of a metal which can be stripped off in an electrolytic bath of an alkali, the thickness of the coating being built up such that the insulated areas are framed. Next the coating is passivated, so that the electrodeposit of a metal during production of a perforated foil does not adhere to the coating.

According to a further object of the invention the base plate is made of a metal which is not attacked in a bath of an alkali. Among those metals which are suitable for this purpose are steel, nickel; and brass.

A further object is to prepare a master negative for the production of perforated foils with raised edge portions by covering a metal base plate of a resistant to a bath of an alkali metal at definite areas with an electric insulating material, and thereafter coating the base plate with tin or zinc and passivating said coating after it has been built up to such thickness that the insulated areas are framed by the coating.

Coatings of tin or zinc gives excellent protection of the edges of the pattern of insulating areas and can be stripped off electrolytically very rapidly in a bath of an alkali.

The passivation of the metal coating, which is to prevent any adhesion of the perforated foils which are to be produced may be carried out in any manner known in the art, for example with bichromate solution.

A metal having a lower melting point than the metal of the base plate may be employed for the coating. The metal coating may then be removed by heat instead of electrolytic attack when repreparing the master negative.

Figure 2:
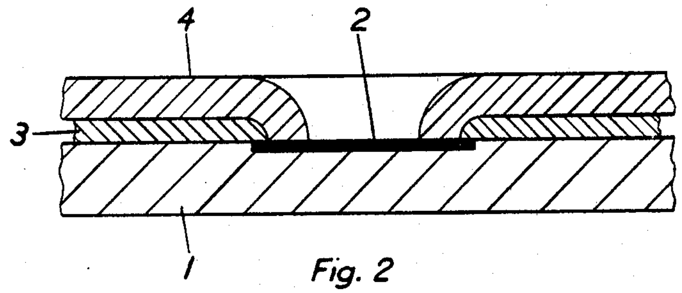

These and other objects of the invention will become apparent from the following description in connection with the accompanying drawings, in which:

FIG. 1 is a cross-sectional view of a plate-shaped master negative produced with insulating spots at the upper surface of a metal base plate; and FIG. 2 is a view similar to FIG. 1, but with the insulating spots embedded into the surface of the plate.

To make a master negative which is partly illustrated in FIG. 1, a base plate 1 of steel, nickel or some other metal which is resistant in baths of alkalies is covered with a pattern of areas of insulating material, also stable in baths of alkalis, which correspond to the subsequent perforations of the foils produced with the master negative. The spots of insulating material may be applied to the metal base plate 1 by a photographic process. The unit is thereafter suspended in an acid tin bath and a tin coating is applied by electroplating the free areas of the metal base plate 1. Electroplating is continued until the difference between the thickness of the metal coating 3 and the thickness of the insulating spots 2 corresponds to the desired height of the edges of the holes or perforations. Finally, the surface of the tin coating is passivated in a bichromate solution and rinsed in clear water.

The master negative produced in this way is then suspended in an electrolytic bath for depositing a perforated foil 4 of for example nickel on it. As is illustrated in FIGS. 1 and 2, the finished foil has a raised portion at each edge of a hole.

The preparation of the master negative which is partly shown in FIG. 2 with a foil applied thereon by electrodeposition differs from the method described above in that the areas of insulating material 2 are embedded in the surface of the metal base plate, for example by etching the same and filling in the etched areas with a layer of insulating material 2.

It will be apparent to those skilled in the art that a master negative produced in accordance with the invention may be reprepared in a simple and rapid manner. Further, the master negative may be used to produce a substantially greater number of perforated foils than the master negatives produced by known processes.

I claim:

1. A process for producing repairable master negative plates for making performated foils by electrodeposition, comprising the steps of of providing a base plate made of a metal which is resistant to a bath of an alkali, forming electrically insulated areas on the base plate in the areas where it is desired to have perforations in the foil with an insulating material which is resistant to a bath of an alkali, electroplating the uninsulated areas of said base plate with a metal selected from the group consisting of tin and zinc which can be dissolved electrochemically in a bath of an alkali, passivating the metal coating so as to enable a foil electrodeposited on the master negative plate to be easily stripped therefrom, electrochemically removing said metal coating after it has been damaged from stripping off foils without removing the insulating areas on the base plate, then re-electroplating the uninsulated areas of said base plate with a metal which can be dissolved electrochemically in a bath of an alkali.

2. A process for producing repairable master negative plates for making perforated foils by electrodeposition, comprising the steps of providing a base plate made of a metal which is resistant to bath of an alkali, forming electrically insulated areas on the base plate in the areas where it is desired to have perforations in the foil with an insulating material which is resistant to a bath of an alkali, electroplating the uninsulated areas of said base plate with a metal coating, passivating the metal coating so as to enable a foil electrodeposited on the master negative plate to be easily stripped therefrom, said metal coating being a metal which has a lower melting point than said base plate metal and said insulated areas, and removing said metal coating after it has been damaged by applying heat, then re-electroplating the uninsulated areas of said base plate with a metal which has a lower melting point than said base plate metal and said insulated area.

References Cited

UNITED STATES PATENTS

| | | | |
|---|---|---|---|
| 1,471,469 | 10/1923 | Kardos | 204—146 |
| 1,867,527 | 7/1932 | Dunn | 204—146 |
| 2,200,782 | 5/1940 | Vollmer | 204—146 |
| 1,589,564 | 6/1926 | Robinson | 204—281 |

FOREIGN PATENTS

| | | | |
|---|---|---|---|
| 1,160,258 | 12/1963 | Germany | 204—11 |
| 17,918 | 1892 | Great Britain | 204—281 |
| 1,147,818 | 4/1963 | Germany | 204—11 |

OTHER REFERENCES

Product Engineering, June 5, 1961 pp. 609–614, W. H. Safranek.

JOHN H. MACK, Primary Examiner

T. TUFARIELLO, Assistant Examiner

U.S. Cl. X.R.

204—11, 146, 281